(12) United States Patent
Kim et al.

(10) Patent No.: US 10,990,147 B2
(45) Date of Patent: Apr. 27, 2021

(54) POWER CONTROL CIRCUIT AND SEMICONDUCTOR APPARATUS INCLUDING THE POWER CONTROL CIRCUIT

(71) Applicant: SK hynix Inc., Icheon-si (KR)

(72) Inventors: Woongrae Kim, Icheon-si (KR); Sang Sic Yoon, Yongin-si (KR)

(73) Assignee: SK hynix Inc., Icheon-si (KR)

( * ) Notice: Subject to any disclaimer, the term of this patent is extended or adjusted under 35 U.S.C. 154(b) by 70 days.

(21) Appl. No.: 16/572,080

(22) Filed: Sep. 16, 2019

(65) Prior Publication Data

US 2020/0177070 A1    Jun. 4, 2020

(30) Foreign Application Priority Data

Nov. 29, 2018   (KR) .................. 10-2018-0150790

(51) Int. Cl.
  *G06F 1/26*       (2006.01)
  *H02M 1/08*       (2006.01)

(52) U.S. Cl.
  CPC ............. *G06F 1/26* (2013.01); *H02M 1/082* (2013.01)

(58) Field of Classification Search
  CPC .......................................... G06F 1/26–1/3296
  See application file for complete search history.

(56) References Cited

U.S. PATENT DOCUMENTS

| 9,065,440 | B2 | 6/2015 | Chromczak | |
|---|---|---|---|---|
| 9,608,639 | B2 * | 3/2017 | Choi | ............ H03L 7/095 |
| 9,698,685 | B2 | 7/2017 | Calhoun et al. | |
| 2003/0093160 | A1 * | 5/2003 | Maksimovic | ............ G06F 1/26 700/14 |
| 2006/0261869 | A1 * | 11/2006 | Gomm | ............ H03L 7/0812 327/158 |
| 2013/0293281 | A1 * | 11/2013 | Baumann | ......... H03K 19/00384 327/419 |
| 2016/0034014 | A1 * | 2/2016 | Turullols | ............ G01R 31/3004 713/320 |
| 2016/0118967 | A1 * | 4/2016 | Krishnamurthy | ..... H03L 7/0818 327/158 |
| 2016/0156354 | A1 * | 6/2016 | Huang | ............ G06F 1/28 327/142 |
| 2017/0149418 | A1 * | 5/2017 | Tessarolo | ............... H03K 5/159 |
| 2017/0288656 | A1 * | 10/2017 | Cho | ............ H03K 5/1565 |
| 2017/0301972 | A1 * | 10/2017 | Dakhiya | ............... H01P 5/184 |
| 2017/0310316 | A1 * | 10/2017 | Shen | ............ H03K 5/135 |
| 2017/0359053 | A1 * | 12/2017 | Peterson | ............... H03K 5/134 |
| 2020/0105316 | A1 * | 4/2020 | Sridharan | .......... H03K 17/6872 |

* cited by examiner

*Primary Examiner* — Rafael O De Leon Domenech
(74) *Attorney, Agent, or Firm* — William Park & Associates Ltd.

(57) ABSTRACT

A semiconductor apparatus may include a logic circuit and a power control circuit. The logic circuit operates by being supplied with power through a power line. The power control circuit includes a plurality of power switches, and supplies a first power supply voltage and a second power supply voltage to the power line. When a mode of the semiconductor apparatus is changed, the power control circuit causes the plurality of power switches to sequentially stop supplying one of the first power supply voltage and the second power supply voltage to the power line, and then causes the plurality of power switches to sequentially supply the other of the first power supply voltage and the second power supply voltage to the power line.

26 Claims, 8 Drawing Sheets

POWER CONTROL CIRCUIT AND SEMICONDUCTOR APPARATUS INCLUDING THE POWER CONTROL CIRCUIT

CROSS-REFERENCES TO RELATED APPLICATION

The present application claims priority under 35 U.S.C. § 119(a) to Korean application number 10-2018-0150790, filed on Nov. 29, 2018, in the Korean Intellectual Property Office, which is incorporated herein by reference in its entirety.

BACKGROUND

1. Technical Field

Various embodiments generally relate to an integrated circuit technology and, more particularly, to a power control circuit and a semiconductor apparatus including the power control circuit.

2. Related Art

Electronic apparatuses may include a large number of electronic components. Among the electronic apparatuses, a computer system may include many electronic components which are constructed by semiconductors. Semiconductor apparatuses which configure the computer system may operate by being applied with a power supply voltage. The power supply voltage may be applied from an external power source such as a power management integrated circuit. The semiconductor apparatuses may operate in various operation modes, and in general, may operate in an active mode and a standby mode. The active mode may be an operation mode in which the semiconductor apparatuses actually perform functions that they may perform, and the standby mode may be a sleep mode in which the semiconductor apparatuses consume minimal power.

The semiconductor apparatuses may use a power gating circuit to minimize power consumption in the standby mode. The power gating circuit may apply a power supply voltage to various logic circuits configuring each semiconductor apparatus in the active mode of the semiconductor apparatus, thereby allowing the semiconductor apparatus to perform various operations. The power gating circuit may block the supply of the power supply voltage to the logic circuits in the standby mode of the semiconductor apparatus, thereby reducing the power consumption of the semiconductor apparatus. The semiconductor apparatus may selectively use at least one of a high power supply voltage and a low power supply voltage depending on the operating frequency of the semiconductor apparatus or a product to which the semiconductor apparatus is applied. Selectively using an appropriate power supply voltage among two or more power supply voltages depending on the operating frequency of the semiconductor apparatus in this way is generally referred to as a dynamic voltage and frequency scaling (DVFS).

SUMMARY

In an embodiment, a power control circuit may include a delay chain, a first power switch, and a second power switch. The delay chain may be configured to generate a second forward switching signal by delaying a first forward switching signal, and generate a second backward switching signal by delaying a first backward switching signal. The first power switch may be configured to supply one of a first power supply voltage and a second power supply voltage to a power line based on a mode change signal, the first forward switching signal and the second backward switching signal. The second power switch may be configured to generate the first backward switching signal based on the second forward switching signal, and supply one of the first power supply voltage and the second power supply voltage to the power line based on the mode change signal, the second forward switching signal and the first backward switching signal.

In an embodiment, a power control circuit may include a delay chain, a first power switch, and a second power switch. The delay chain may be configured to generate a second high gating signal and a second low gating signal by delaying a first high gating signal and a first low gating signal, and generate a second high switching signal and a second low switching signal by delaying a first high switching signal and a first low switching signal. The first power switch configured to supply a first power supply voltage and a second power supply voltage to a power line based on the first high gating signal, the first low gating signal, the second high switching signal and the second low switching signal. The second power switch may be configured to supply the first power supply voltage and the second power supply voltage to the power line based on the second high gating signal, the second low gating signal, the first high switching signal and the first low switching signal, generate the first high switching signal based on the second high gating signal, and generate the first low switching signal based on the second low gating signal.

In an embodiment, a semiconductor apparatus may include at least one logic circuit and a power control circuit. The at least one logic circuit may be configured to operate by being supplied with power through a power line. The power control circuit may include first to n^th power switches which supply a first power supply voltage and a second power supply voltage to the power line, n being an integer equal to or more than 2. When being changed to a first mode, the power control circuit causes the first to n^th power switches to sequentially stop supplying the second power supply voltage to the power line and then causes the n^th to first power switches to sequentially supply the first power supply voltage to the power line, and, when being changed to a second mode, the power control circuit causes the first to n^th power switches to sequentially stop supplying the first power supply voltage to the power line and then causes the n^th to first power switches to sequentially supply the second power supply voltage to the power line.

DETAILED DESCRIPTION

Hereinafter, a power control circuit and a semiconductor apparatus including the same will be described below with reference to the accompanying drawings through various embodiments.

A high level and a low level, as used herein with respect to signals, refer to logic levels of the signals. A signal having a low level distinguishes from the signal when it has a high level. For example, the high level may correspond to the signal having a first voltage, and the low level may correspond to the signal having a second voltage. For some embodiments, the first voltage is greater than the second voltage. Further, the logic levels of the signals may be different from or the opposite of those described. For example, a signal described as having a logic "high" level may alternatively have a logic "low" level, and a signal described as having a logic "low" level may alternatively have a logic "high" level.

Figure 1:
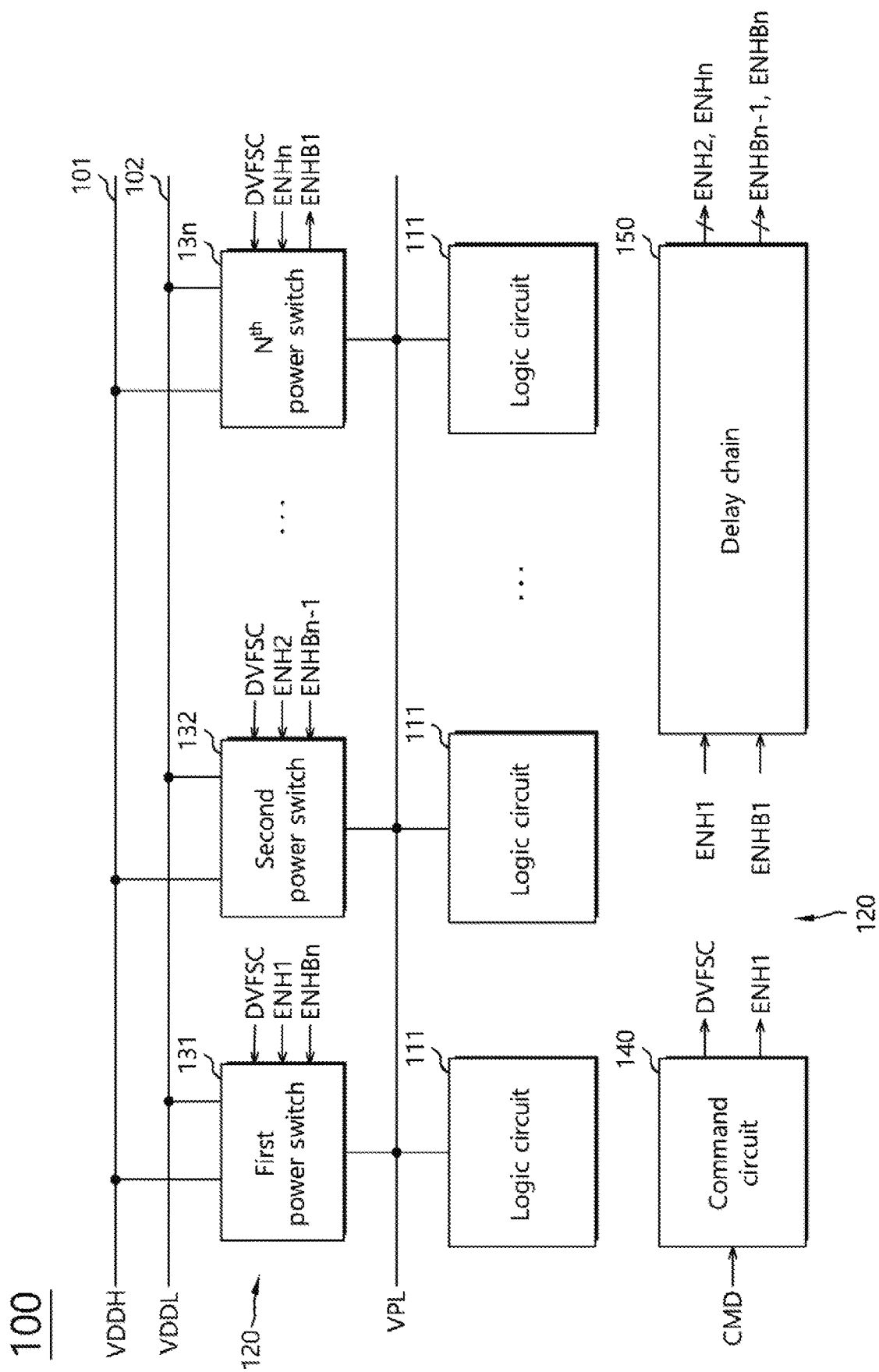
FIG. 1 is a diagram illustrating a configuration of a semiconductor apparatus in accordance with an embodiment.

FIG. 1 is a diagram illustrating a configuration of a semiconductor apparatus 100 in accordance with an embodiment. The semiconductor apparatus 100 may operate by being supplied with a first power supply voltage VDDH and a second power supply voltage VDDL. The first power supply voltage VDDH may have a level higher than the second power supply voltage VDDL, and the second power supply voltage VDDL may have a level higher than a ground voltage. The semiconductor apparatus 100 may operate by being supplied with one of the first and second power supply voltages VDDH and VDDL depending on the operating speed and/or operation mode of the semiconductor apparatus 100. For example, the semiconductor apparatus 100 may operate by being supplied with the first power supply voltage VDDH, in a first mode, and may operate by being supplied with the second power supply voltage VDDL, in a second mode. The first and second modes may be determined based on the operating speed of the semiconductor apparatus 100, and any one mode may be changed to the other mode depending on the operating speed of the semiconductor apparatus 100. For example, the first mode may mean a mode in which the semiconductor apparatus 100 operates at a relatively high speed in synchronization with a high-frequency clock signal. The second mode may mean a mode in which the semiconductor apparatus 100 operates at a relatively low speed in synchronization with a low-frequency clock signal. The semiconductor apparatus 100 may perform a dynamic voltage and frequency scaling (DVFS) of selecting and using one of the first and second power supply voltages VDDH and VDDL depending on the operating speed of the semiconductor apparatus 100. The semiconductor apparatus 100 may operate at a relatively high speed in the first mode by being supplied with the first power supply voltage VDDH having a higher level. The semiconductor apparatus 100 may operate at a relatively low speed in the second mode by being supplied with the second power supply voltage VDDL having a lower level.

The semiconductor apparatus 100 may include a first power supply voltage line 101, a second power supply voltage line 102, a power line VPL and a plurality of logic circuits 111. The first power supply voltage line 101 may be a power mesh, and may be a line and/or a terminal to which the first power supply voltage VDDH is supplied. The second power supply voltage line 102 may be a power mesh, and may be a line and/or a terminal to which the second power supply voltage VDDL is supplied. The power line VPL may be a virtual power mesh and/or line. The power line VPL may be directly coupled with the logic circuits 111. The power line VPL may be coupled with one of the first power supply voltage line 101 and the second power supply voltage line 102, and thereby, may supply one of the first and second power supply voltages VDDH and VDDL to the plurality of logic circuits 111. The plurality of logic circuits 111 as circuits in the semiconductor apparatus 100 may include circuits which perform any functions. The plurality of logic circuits 111 may be circuits which perform different functions and operations from one another. Some of the plurality of logic circuits 111 may perform the same function with one another.

The semiconductor apparatus 100 may include a power control circuit 120. The power control circuit 120 may be coupled between the first and second power supply voltage lines 101 and 102 and the power line VPL. The power control circuit 120 may couple one of the first and second power supply voltage lines 101 and 102 with the power line VPL depending on the operating speed and/or operation mode of the semiconductor apparatus 100, thereby supplying one of the first and second power supply voltages VDDH and VDDL to the power line VPL. For example, the power control circuit 120 may couple the first power supply voltage line 101 and the power line VPL in the first mode, thereby supplying the first power supply voltage VDDH to the power line VPL. The power control circuit 120 may couple the second power supply voltage line 102 and the power line VPL in the second mode, thereby supplying the second power supply voltage VDDL to the power line VPL.

In FIG. 1, the power control circuit 120 may include a plurality of power switches. FIG. 1 illustrates that the power control circuit 120 includes n number of power switches. n may be an integer equal to or more than 2. First to n^th power switches 131 to 13n may each supply the first power supply voltage VDDH to the power line VPL or may each supply the second power supply voltage VDDL to the power line VPL. The first to n^th power switches 131 to 13n may each supply the first power supply voltage VDDH to the power line VPL in the first mode or may each supply the second power supply voltage VDDL to the power line VPL in the second mode. The power control circuit 120 may sequentially control the first to n^th power switches 131 to 13n when a mode is changed. When the first mode is changed to the second mode, the power control circuit 120 may sequentially stop the first to n^th power switches 131 to 13n from supplying the first power supply voltage VDDH to the power line VPL, and then, may cause the n^th to first power switches 13n to 131 to sequentially supply the second power supply voltage VDDL to the power line VPL. When the second mode is changed to the first mode, the power control circuit 120 may sequentially stop the first to n^th power switches 131 to 13n from supplying the second power supply voltage VDDL to the power line VPL, and then, may cause the n^th to first power switches 13n to 131 to sequentially supply the first power supply voltage VDDH to the power line VPL.

The power control circuit 120 may include at least one normal power switch and at least one turning point power switch. The first and second power switches 131 and 132 may be normal power switches, respectively. The n^th power switch 13n may be a turning point power switch. When a mode is changed, the first power switch 131 and the second power switch 132 may stop supplying one of the first and second power supply voltages VDDH and VDDL, and, after a predetermined time elapses, may be switched to supply the other one of the first and second power supply voltages VDDH and VDDL to the power line VPL. When a mode is changed, the n^th power switch 13n may stop supplying one of the first and second power supply voltages VDDH and VDDL, and may be switched to supply the other one of the first and second power supply voltages VDDH and VDDL. The word "predetermined" as used herein with respect to a parameter, such as a predetermined time, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

When the first mode is changed to the second mode, the first and second power switches 131 and 132 may sequentially stop supplying the first power supply voltage VDDH to the power line VPL. The n^th power switch 13n may stop supplying the first power supply voltage VDDH to the power line VPL, and may supply the second power supply voltage VDDL to the power line VPL. The n^th power switch 13n may supply the second power supply voltage VDDL to the power line VPL at substantially the same time as and/or with a substantially short time interval from when it stops supplying the first power supply voltage VDDH to the power line VPL. Thereafter, the second power switch 132 and the first power switch 131 may sequentially supply the second power supply voltage VDDL to the power line VPL. The substantially short time interval may be shorter than a time from after the first power switch 131 stops supplying the first power supply voltage VDDH to the power line VPL to when the second power switch 132 stops supplying the first power supply voltage VDDH to the power line VPL. Also, the substantially short time interval may be shorter than a time from after the second power switch 132 supplies the second power supply voltage VDDL to the power line VPL to when the first power switch 131 supplies the second power supply voltage VDDL to the power line VPL.

When the second mode is changed to the first mode, the first and second power switches 131 and 132 may sequentially stop supplying the second power supply voltage VDDL to the power line VPL. The n^th power switch 13n may stop supplying the second power supply voltage VDDL to the power line VPL, and may supply the first power supply voltage VDDH to the power line VPL. The n^th power switch 13n may supply the first power supply voltage VDDH to the power line VPL at substantially the same time as and/or with a substantially short time interval from when it stops supplying the second power supply voltage VDDL to the power line VPL. Thereafter, the second power switch 132 and the first power switch 131 may sequentially supply the first power supply voltage VDDH to the power line VPL. Through the above-described operation of the power control circuit 120, when a mode is changed, the semiconductor apparatus 100 may disperse the switching timings of the plurality of power switches, and may reduce the power consumed by the semiconductor apparatus 100 and the generation of peak current. Moreover, when a mode is changed, since the n^th power switch 13n operating as a turning point power switch may supply the other power supply voltage at substantially the same time as and/or with a substantially short time interval from when it stops supplying one power supply voltage, it is possible to prevent the power line VPL from being floated.

In FIG. 1, the power control circuit 120 may further include a command circuit 140 and a delay chain 150. The command circuit 140 may receive a command signal CMD. In an embodiment, the command signal CMD may be received from an external apparatus which controls the semiconductor apparatus 100 to change a mode. In an embodiment, the command signal CMD may be generated in the semiconductor apparatus 100 to change a mode. The command circuit 140 may generate a mode change signal DVFSC and a first forward switching signal ENH1 based on the command signal CMD. The mode change signal DVFSC may be a signal for changing the mode of the semiconductor apparatus 100 from the first mode to the second mode or from the second mode to the first mode. For example, the mode change signal DVFSC may have a logic low level in the first mode and have a logic high level in the second mode. The first forward switching signal ENH1 may be a signal for controlling the first power switch 131. The first forward switching signal ENH1 may be a signal for stopping the first power switch 131 from supplying one of the first and second power supply voltages VDDH and VDDL to the power line VPL. For example, when the first mode is changed to the second mode, the command circuit 140 may cause the first forward switching signal ENH1 to have a logic low level. When the second mode is changed to the first mode, the command circuit 140 may cause the first forward switching signal ENH1 to have a logic high level.

The delay chain 150 may receive the first forward switching signal ENH1. The delay chain 150 may generate a plurality of forward switching signals by sequentially delaying the first forward switching signal ENH1. For example, the delay chain 150 may generate a second forward switching signal ENH2 by delaying the first forward switching signal ENH1 by a first time. The second forward switching signal ENH2 may be a signal for stopping the second power switch 132 from supplying one of the first and second power supply voltages VDDH and VDDL to the power line VPL. The delay chain 150 may generate an n^th forward switching signal ENHn by delaying the first forward switching signal ENH1 by n−1 times a first time. The n^th forward switching signal ENHn may be a signal for stopping the n^th power switch 13n from supplying one of the first and second power supply voltages VDDH and VDDL to the power line VPL.

The delay chain 150 may receive a first backward switching signal ENHB1. The first backward switching signal ENHB1 may be generated from the n^th power switch 13n. The n^th power switch 13n may generate the first backward switching signal ENHB1 from the n^th forward switching signal ENHn. The first backward switching signal ENHB1 may be a signal for causing the n^th power switch 13n to supply one of the first and second power supply voltages VDDH and VDDL to the power line VPL. In an embodiment, the n^th power switch 13n may generate the first backward switching signal ENHB1 a second time after the logic level of the n^th forward switching signal ENHn transitions. The duration of the second time may be shorter than the duration of the first time. The delay chain 150 may generate a plurality of backward switching signals by sequentially delaying the first backward switching signal ENHB1. The delay chain 150 may generate an (n−1)^th backward switching signal ENHBn−1 and an n^th backward switching signal ENHBn by sequentially delaying the first backward switching signal ENHB1 by the duration of the first time. The delay chain 150 may generate the (n−1)^th backward switching signal ENHBn−1 by delaying the first backward switching signal ENHB1 by (n−2) times the duration of the first time, and may generate the n^th backward switching signal ENHBn by delaying the first backward switching signal ENHB1 by (n−1) times the duration of the first time. The (n−1)^th backward switching signal ENHBn−1 may be a signal for causing the second power switch 132 to supply one of the first and second power supply voltages VDDH and VDDL to the power line VPL. The n^th backward switching signal ENHBn may be a signal for causing the first power switch 131 to supply one of the first and second power supply voltages VDDH and VDDL to the power line VPL.

The first power switch 131 may receive the mode change signal DVFSC, the first forward switching signal ENH1 and the n^th backward switching signal ENHBn. The first power switch 131 may supply one of the first and second power supply voltages VDDH and VDDL to the power line VPL based on the mode change signal DVFSC, the first forward switching signal ENH1 and the n^th backward switching signal ENHBn. When a mode is changed, the first power switch 131 may stop supplying one of the first and second power supply voltages VDDH and VDDL to the power line VPL, based on the first forward switching signal ENH1, and may supply the other of the first and second power supply voltages VDDH and VDDL to the power line VPL, based on the n^th backward switching signal ENHBn. The second power switch 132 may receive the mode change signal DVFSC, the second forward switching signal ENH2 and the (n−1)^th backward switching signal ENHBn−1. The second power switch 132 may supply one of the first and second power supply voltages VDDH and VDDL to the power line VPL based on the mode change signal DVFSC, the second forward switching signal ENH2 and the (n−1)^th backward switching signal ENHBn−1. When a mode is changed, the second power switch 132 may stop supplying one of the first and second power supply voltages VDDH and VDDL to the power line VPL, based on the second forward switching signal ENH2, and may supply the other of the first and second power supply voltages VDDH and VDDL to the power line VPL, based on the (n−1)^th backward switching signal ENHBn−1.

The n^th power switch 13n may receive the mode change signal DVFSC and the n^th forward switching signal ENHn. The n^th power switch 13n may generate the first backward switching signal ENHB1 based on the n^th forward switching signal ENHn. The n^th power switch 13n may supply one of the first and second power supply voltages VDDH and VDDL to the power line VPL based on the mode change signal DVFSC, the n^th forward switching signal ENHn and the first backward switching signal ENHB1. When a mode is changed, the n^th power switch 13n may stop supplying one of the first and second power supply voltages VDDH and VDDL to the power line VPL, based on the n^th forward switching signal ENHn, and may generate the first backward switching signal ENHB1. The n^th power switch 13n may supply the other of the first and second power supply voltages VDDH and VDDL to the power line VPL based on the first backward switching signal ENHB1.

Figure 2:
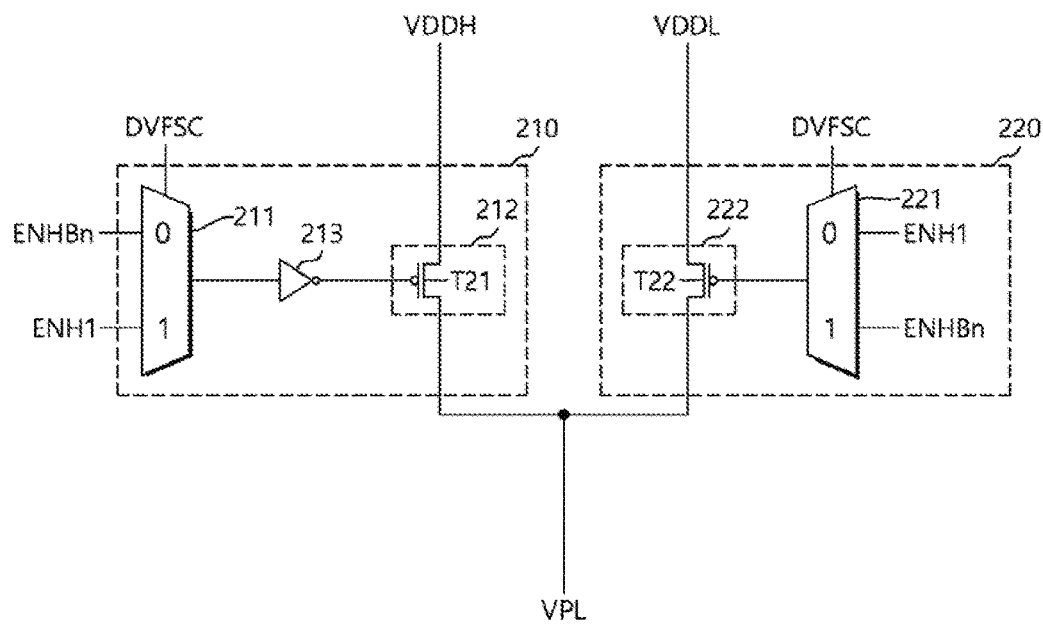
FIG. 2 is a diagram illustrating a configuration of a normal power switch in accordance with an embodiment.

FIG. 2 is a diagram illustrating a configuration of a normal power switch 200 in accordance with an embodiment. The normal power switch 200 may be applied as each of the first and second power switches 131 and 132 illustrated in FIG. 1. FIG. 2 illustrates that the normal power switch 200 is applied as the first power switch 131 illustrated in FIG. 1. The normal power switch 200 may include a high power switch 210 and a low power switch 220. The high power switch 210 may supply the first power supply voltage VDDH to the power line VPL based on the mode change signal DVFSC, the first forward switching signal ENH1 and the n^th backward switching signal ENHBn. The high power switch 210 may supply the first power supply voltage VDDH to the power line VPL or stop supplying the first power supply voltage VDDH to the power line VPL, based on one of the first forward switching signal ENH1 and the n^th backward switching signal ENHBn depending on the mode change signal DVFSC. The low power switch 220 may supply the second power supply voltage VDDL to the power line VPL based on the mode change signal DVFSC, the first forward switching signal ENH1 and the n^th backward switching signal ENHBn. The low power switch 220 may supply the second power supply voltage VDDL to the power line VPL or stop supplying the second power supply voltage VDDL to the power line VPL, based on one of the first forward switching signal ENH1 and the n^th backward switching signal ENHBn depending on the mode change signal DVFSC.

The high power switch 210 may include a first selector 211 and a first driver 212. The first selector 211 may receive the mode change signal DVFSC, the first forward switching signal ENH1 and the n^th backward switching signal ENHBn. The first selector 211 may output one of the first forward switching signal ENH1 and the n^th backward switching signal ENHBn based on the mode change signal DVFSC. For example, the first selector 211 may output the first forward switching signal ENH1 when the mode change signal DVFSC is at a logic high level, and may output the n^th backward switching signal ENHBn when the mode change signal DVFSC is at a logic low level. The first driver 212 may be coupled with the first selector 211 and thereby receive the output of the first selector 211. The first driver 212 may supply the first power supply voltage VDDH to the power line VPL based on the output of the first selector 211. For example, the first driver 212 may supply the first power supply voltage VDDH to the power line VPL based on the inverted signal of the output of the first selector 211. The high power switch 210 may further include an inverter 213 which inverts the output of the first selector 211.

The low power switch 220 may include a second selector 221 and a second driver 222. The second selector 221 may receive the mode change signal DVFSC, the first forward switching signal ENH1 and the n^th backward switching signal ENHBn. The second selector 221 may output one of the first forward switching signal ENH1 and the n^th backward switching signal ENHBn based on the mode change signal DVFSC. For example, the second selector 221 may output the n^th backward switching signal ENHBn when the mode change signal DVFSC is at a logic high level, and may output the first forward switching signal ENH1 when the mode change signal DVFSC is at a logic low level. The second driver 222 may be coupled with the second selector 221 and thereby receive the output of the second selector 221. The second driver 222 may supply the second power supply voltage VDDL to the power line VPL based on the output of the second selector 221.

The first driver 212 may include a first transistor T21. The first transistor T21 may be a P-channel MOS transistor. The first transistor T21 may have a gate which receives the output of the inverter 213, a source which receives the first power supply voltage VDDH and a drain which is coupled with the power line VPL. The second driver 222 may include a second transistor T22. The second transistor T22 may be a P-channel MOS transistor. The second transistor T22 may have a gate which receives the output of the second selector 221, a source which receives the second power supply voltage VDDL and a drain which is coupled with the power line VPL.

Figure 3:
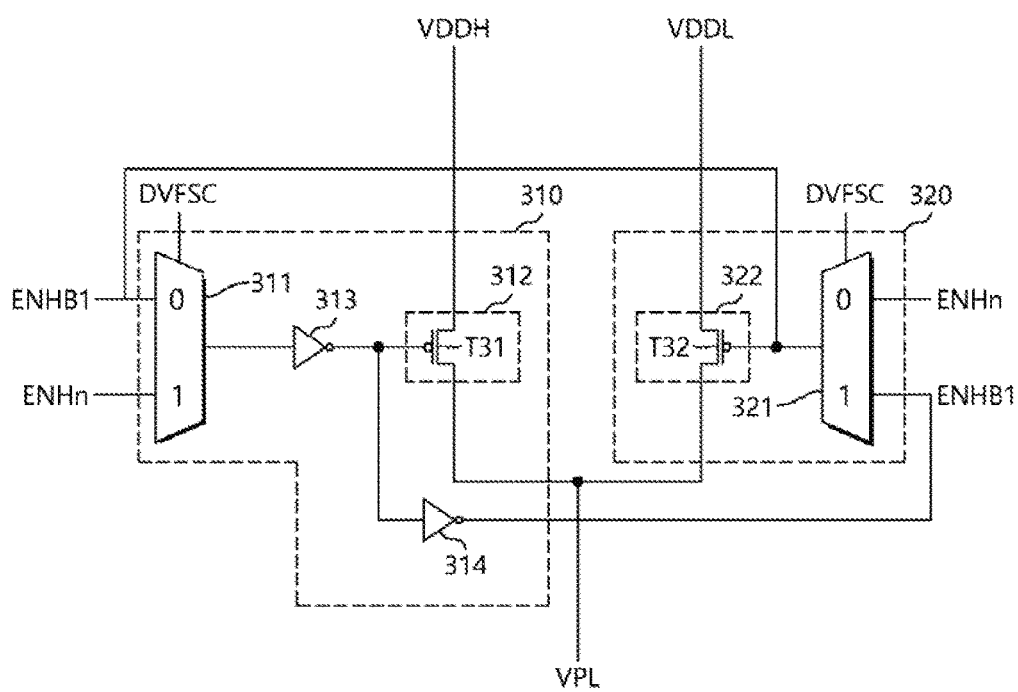
FIG. 3 is a diagram illustrating a configuration of a turning point power switch in accordance with an embodiment.

FIG. 3 is a diagram illustrating a configuration of a turning point power switch 300 in accordance with an embodiment. The turning point power switch 300 may be applied as the nˆth power switch 13n illustrated in FIG. 1. FIG. 3 illustrates that the turning point power switch 300 is applied as the nˆth power switch 13n. The turning point power switch 300 may include a high power switch 310 and a low power switch 320. The high power switch 310 may supply the first power supply voltage VDDH to the power line VPL based on the mode change signal DVFSC, the nˆth forward switching signal ENHn and the first backward switching signal ENHB1. The high power switch 310 may supply the first power supply voltage VDDH to the power line VPL or stop supplying the first power supply voltage VDDH to the power line VPL, based on one of the nˆth forward switching signal ENHn and the first backward switching signal ENHB1 depending on the mode change signal DVFSC. The low power switch 320 may supply the second power supply voltage VDDL to the power line VPL based on the mode change signal DVFSC, the nˆth forward switching signal ENHn and the first backward switching signal ENHB1. The low power switch 320 may supply the second power supply voltage VDDL to the power line VPL or stop supplying the second power supply voltage VDDL to the power line VPL, based on one of the nˆth forward switching signal ENHn and the first backward switching signal ENHB1 depending on the mode change signal DVFSC. The high power switch 310 and the low power switch 320 may generate the first backward switching signal ENHB1 based on the nˆth forward switching signal ENHn. The high power switch 310 may generate the first backward switching signal ENHB1 to be inputted to the low power switch 320, from the received nˆth forward switching signal ENHn. The low power switch 320 may generate the first backward switching signal ENHB1 to be inputted to the high power switch 310, from the received nˆth forward switching signal ENHn.

The high power switch 310 may include a first selector 311 and a first driver 312. The first selector 311 may receive the mode change signal DVFSC, the nˆth forward switching signal ENHn and the first backward switching signal ENHB1. The first selector 311 may output one of the nˆth forward switching signal ENHn and the first backward switching signal ENHB1 based on the mode change signal DVFSC. For example, when the mode change signal DVFSC is at a logic high level, the first selector 311 may output the nˆth forward switching signal ENHn. When the mode change signal DVFSC is at a logic low level, the first selector 311 may output the first backward switching signal ENHB1. The first driver 312 may be coupled with the first selector 311 and thereby receive the output of the first selector 311. The first driver 312 may supply the first power supply voltage VDDH to the power line VPL based on the output of the first selector 311. For example, the first driver 312 may supply the first power supply voltage VDDH to the power line VPL based on the inverted signal of the output of the first selector 311. The high power switch 310 may further include a first inverter 313 which inverts the output of the first selector 311.

The low power switch 320 may include a second selector 321 and a second driver 322. The second selector 321 may receive the mode change signal DVFSC, the nˆth forward switching signal ENHn and the first backward switching signal ENHB1. The second selector 321 may output one of the nˆth forward switching signal ENHn and the first backward switching signal ENHB1 based on the mode change signal DVFSC. For example, the second selector 321 may output the first backward switching signal ENHB1 when the mode change signal DVFSC is at a logic high level, and may output the nˆth forward switching signal ENHn when the mode change signal DVFSC is at a logic low level. The second driver 322 may be coupled with the second selector 321 and thereby receive the output of the second selector 321. The second driver 322 may supply the second power supply voltage VDDL to the power line VPL based on the output of the second selector 321.

The first backward switching signal ENHB1 may be generated based on the outputs of the first and second selectors 311 and 321. For example, the first backward switching signal ENHB1 to be inputted to the second selector 321 may be generated based on the nˆth forward switching signal ENHn outputted from the first selector 311, and the first backward switching signal ENHB1 to be inputted to the first selector 311 may be generated based on the nˆth forward switching signal ENHn outputted from the second selector 321. For example, when the mode change signal DVFSC is at a logic high level, the first selector 311 may output the nˆth forward switching signal ENHn, and the first backward switching signal ENHB1 may be generated from the nˆth forward switching signal ENHn. The generated first backward switching signal ENHB1 may be inputted to the second selector 321. The high power switch 310 may further include a second inverter 314 which inverts the output of the first inverter 313 and generates the first backward switching signal ENHB1 to be inputted to the second selector 321. When the mode change signal DVFSC is at a logic low level, the second selector 321 may output the nˆth forward switching signal ENHn, and the first backward switching signal ENHB1 may be generated from the nˆth forward switching signal ENHn. The generated first backward switching signal ENHB1 may be inputted to the first selector 311. The turning point power switch 300 may generate the first backward switching signal ENHB1 based on the nˆth forward switching signal ENHn which is outputted from one of the first and second selectors 311 and 321. Therefore, it is possible to transition the logic level of the first backward switching signal ENHB1 at substantially the same time as and/or with a substantially short time interval from when the logic level of the nˆth forward switching signal ENHn transitions.

The first driver 312 may include a first transistor T31. The first transistor T31 may be a P-channel MOS transistor. The first transistor T31 may have a gate which receives the output of the first inverter 313, a source which receives the first power supply voltage VDDH and a drain which is coupled with the power line VPL. The second driver 322 may include a second transistor T32. The second transistor T32 may be a P-channel MOS transistor. The second transistor T32 may have a gate which receives the output of the second selector 321, a source which receives the second power supply voltage VDDL and a drain which is coupled with the power line VPL.

Figure 4:
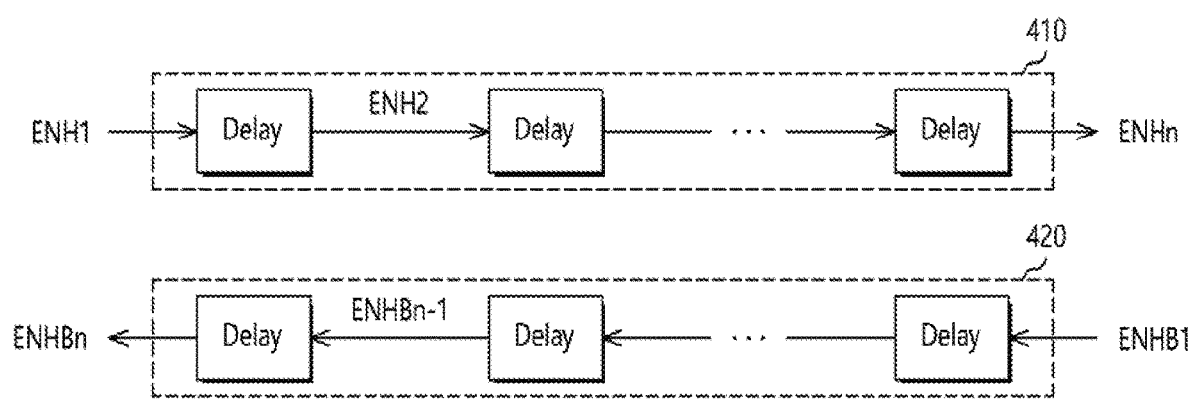
FIG. 4 is a diagram illustrating a configuration of the delay chain illustrated in FIG. 1.

FIG. 4 is a diagram illustrating a configuration of the delay chain 150 illustrated in FIG. 1. In FIG. 4, the delay chain 150 may include a forward delay chain 410 and a backward delay chain 420. Each of the forward delay chain 410 and the backward delay chain 420 may include a plurality of delays. The delay amount of one delay may be a duration of the time. The delays of each of the forward delay chain 410 and the backward delay chain 420 may be coupled in series. The forward delay chain 410 may receive the first forward switching signal ENH1, and may generate the second forward switching signal ENH2 and the n^th forward switching signal ENHn by sequentially delaying the first forward switching signal ENH1. The backward delay chain 420 may receive the first backward switching signal ENHB1, and may generate the (n−1)^th backward switching signal ENHBn−1 and the n^th backward switching signal ENHBn by sequentially delaying the first backward switching signal ENHB1.

Figure 5:
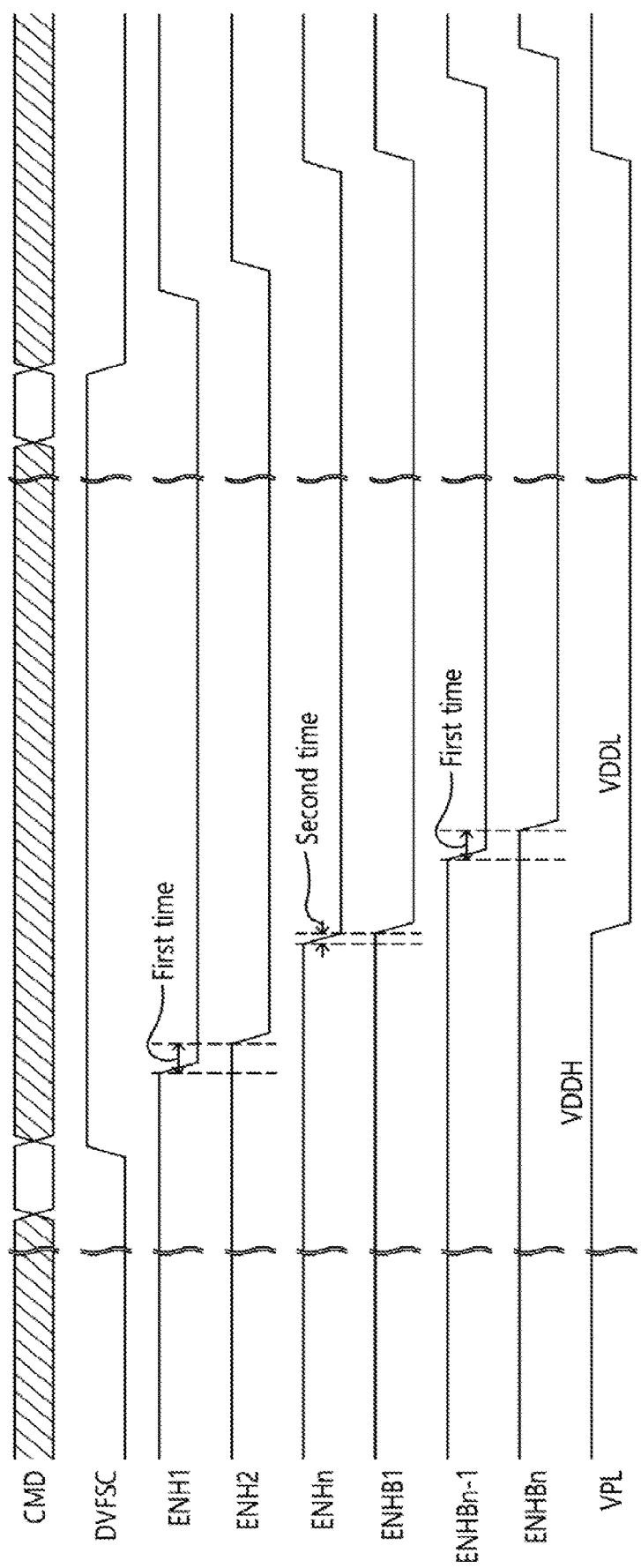
FIG. 5 is a timing diagram to assist in the explanation of the operation of the semiconductor apparatus in accordance with an embodiment.

FIG. 5 is a timing diagram to assist in the explanation of the operation of the semiconductor apparatus 100 in accordance with an embodiment. The operation of the semiconductor apparatus 100 in accordance with an embodiment will be described hereunder with reference to FIGS. 1 to 5. When the semiconductor apparatus 100 operates in the first mode, the plurality of forward switching signals ENH1, ENH2 and ENHn and the plurality of backward switching signals ENHB1, ENHBn−1 and ENHBn may have logic high levels. The mode change signal DVFSC may be at a logic low level. Thus, the first to n^th power switches 131 to 13n may supply the first power supply voltage VDDH to the power line VPL based on the n^th backward switching signal ENHBn, the (n−1)^th backward switching signal ENHBn−1 and the first backward switching signal ENHB1, respectively, which have logic high levels. If the command signal CMD is inputted to change the mode of the semiconductor apparatus 100 from the first mode to the second mode, the command circuit 140 may transition the mode change signal DVFSC to a logic high level and transition the first forward switching signal ENH1 to a logic low level. The first power switch 131 may stop supplying the first power supply voltage VDDH to the power line VPL, based on the first forward switching signal ENH1 which has the logic low level. The delay chain 150 may sequentially delay the first forward switching signal ENH1. The delay chain 150 may generate the second forward switching signal ENH2 and the n^th forward switching signal ENHn by sequentially delaying the first forward switching signal ENH1 by the duration of the first time. The second forward switching signal ENH2 may transition to a logic low level after the duration of the first time. The second power switch 132 may stop supplying the first power supply voltage VDDH to the power line VPL, based on the second forward switching signal ENH2 after the duration of the first time.

The n^th forward switching signal ENHn may transition to a logic low level after a duration of time corresponding to n−1 times the duration of the first time. The n^th power switch 13n may stop supplying the first power supply voltage VDDH to the power line VPL, based on the n^th forward switching signal ENHn. At this time, the n^th power switch 13n may generate the first backward switching signal ENHB1 based on the n^th forward switching signal ENHn. The n^th power switch 13n may transition the logic level of the first backward switching signal ENHB1 after a duration of the second time beginning when the logic level of the n^th forward switching signal ENHn transitions. Therefore, the n^th power switch 13n may supply the second power supply voltage VDDL to the power line VPL after the duration of the second time beginning when the supply of the first power supply voltage VDDH to the power line VPL is stopped.

The delay chain 150 may sequentially delay the first backward switching signal ENHB1. The delay chain 150 may generate the (n−1)^th backward switching signal ENHBn−1 and the n^th backward switching signal ENHBn by sequentially delaying the first backward switching signal ENHB1 by the duration of the first time. The (n−1)^th backward switching signal ENHBn−1 may transition to a logic low level after a time duration corresponding to n−2 times the duration of the first time, the time duration may begin after the first backward switching signal ENHB1 transitions to a logic low level. The second power switch 132 may supply the second power supply voltage VDDL to the power line VPL based on the (n−1)^th backward switching signal ENHBn−1. The n^th backward switching signal ENHBn may transition to a logic low level after a time duration corresponding to n−1 times the duration of the first time, the time duration may begin after the first backward switching signal ENHB1 transitions to a logic low level. The first power switch 131 may supply the second power supply voltage VDDL to the power line VPL based on the n^th backward switching signal ENHBn after a time corresponding to n−1 times the duration of the first time.

As described above, when the first mode is changed to the second mode depending on the operating speed of the semiconductor apparatus 100, the plurality of power switches may sequentially stop supplying the first power supply voltage VDDH to the power line VPL. The n^th power switch 13n may supply the second power supply voltage VDDL to the power line VPL at substantially the same time as and/or with a substantially short time interval from when it stops supplying the first power supply voltage VDDH to the power line VPL. Thereafter, the plurality of power switches may sequentially supply the second power supply voltage VDDL to the power line VPL.

If the command signal CMD is inputted to change the second mode to the first mode depending on the operating speed of the semiconductor apparatus 100, the command circuit 140 may transition the mode change signal DVFSC to a logic low level and transition the first forward switching signal ENH1 to a logic high level. The first power switch 131 may stop supplying the second power supply voltage VDDL to the power line VPL, based on the first forward switching signal ENH1 which has the logic high level. The delay chain 150 may sequentially delay the first forward switching signal ENH1. The delay chain 150 may generate the second forward switching signal ENH2 and the n^th forward switching signal ENHn by sequentially delaying the first forward switching signal ENH1 by the duration of the first time. The second forward switching signal ENH2 may transition to a logic high level after the duration of the first time. The second power switch 132 may stop supplying the second power supply voltage VDDL to the power line VPL, based on the second forward switching signal ENH2.

The n^th forward switching signal ENHn may transition to a logic high level after a time corresponding to n−1 times the duration of the first time. The n^th power switch 13n may stop supplying the second power supply voltage VDDL to the power line VPL, based on the n^th forward switching signal ENHn. At this time, the n^th power switch 13n may generate the first backward switching signal ENHB1 based on the n^th forward switching signal ENHn. The n^th power switch 13n may transition the logic level of the first backward switching signal ENHB1 after the duration of the second time which begins after the logic level of the n^th forward switching signal ENHn transitions. If the n^th forward switching signal ENHn transitions to a logic high level, the n^th power switch 13n may transition the first backward switching signal ENHB1 to a logic high level after the duration of the second time. Therefore, the n^th power switch 13n may supply the first power supply voltage VDDH to the power line VPL after the duration of the second time beginning when the supply of the second power supply voltage VDDL to the power line VPL is stopped.

The delay chain 150 may sequentially delay the first backward switching signal ENHB1. The delay chain 150 may generate the (n−1)^th backward switching signal ENHBn−1 and the n^th backward switching signal ENHBn by sequentially delaying the first backward switching signal ENHB1 by the duration of the first time. The (n−1)^th backward switching signal ENHBn−1 may transition to a logic high level after a time duration corresponding to n−2 times the duration of the first time, the time duration may begin after the first backward switching signal ENHB1 transitions to a logic high level. The second power switch 132 may supply the first power supply voltage VDDH to the power line VPL based on the (n−1)^th backward switching signal ENHBn−1. The n^th backward switching signal ENHBn may transition to a logic high level after a time duration corresponding to n−1 times the duration of the first time, the time duration may begin after the first backward switching signal ENHB1 transitions to a logic high level. The first power switch 131 may supply the first power supply voltage VDDH to the power line VPL based on the n^th backward switching signal ENHBn.

As described above, when the second mode is changed to the first mode depending on the operating speed of the semiconductor apparatus 100, the plurality of power switches may sequentially stop supplying the second power supply voltage VDDL to the power line VPL. The n^th power switch 13n may supply the first power supply voltage VDDH to the power line VPL at substantially the same time as and/or with a substantially short time interval from when it stops supplying the second power supply voltage VDDL to the power line VPL. Thereafter, the plurality of power switches may sequentially supply the first power supply voltage VDDH to the power line VPL.

Figure 6:
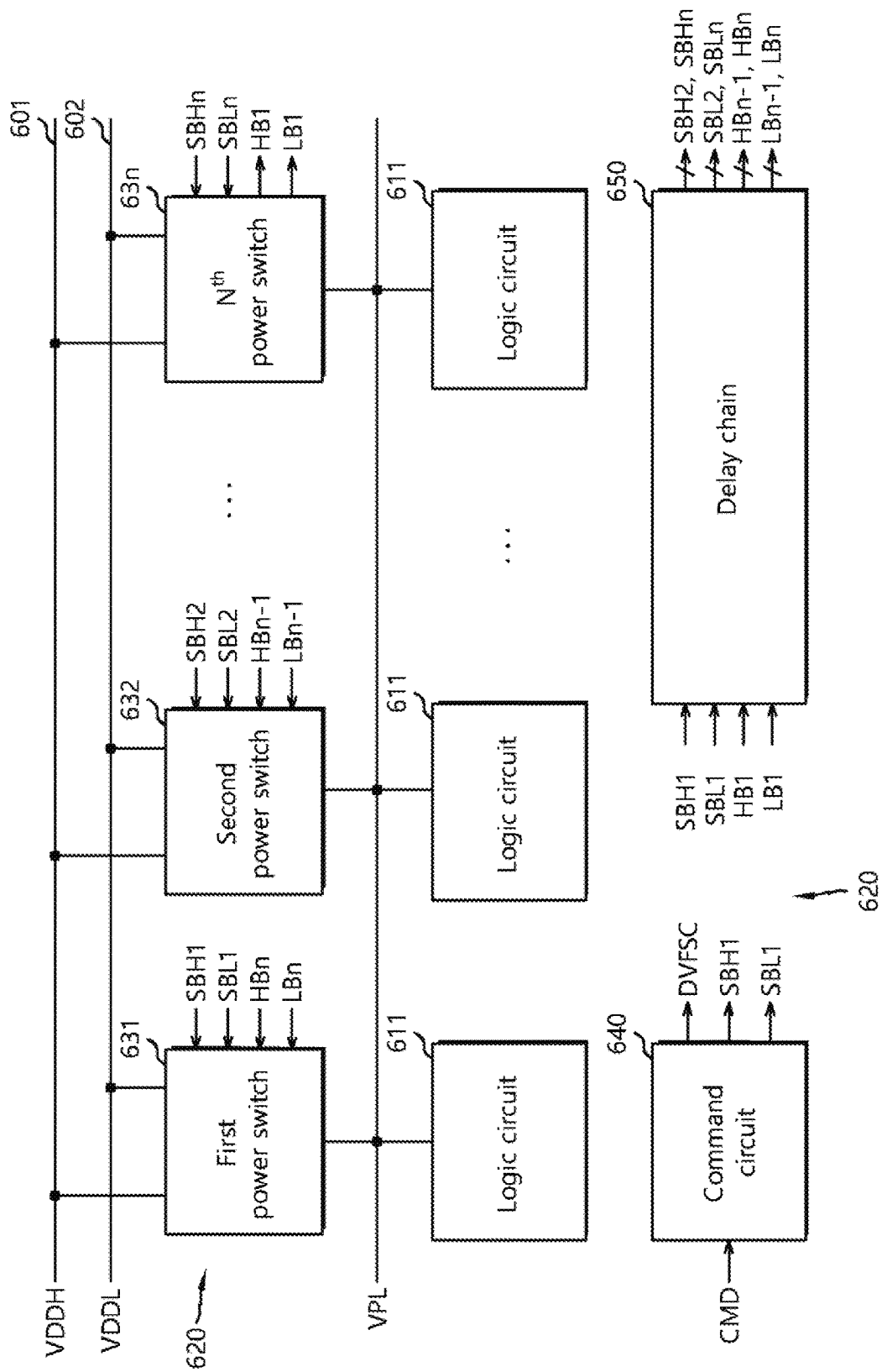
FIG. 6 is a diagram illustrating a configuration of a semiconductor apparatus in accordance with an embodiment.

FIG. 6 is a diagram illustrating a configuration of a semiconductor apparatus 600 in accordance with an embodiment. The semiconductor apparatus 600 may have a configuration similar to that of the semiconductor apparatus 100 illustrated in FIG. 1. The semiconductor apparatus 600 may include a first power supply voltage line 601, a second power supply voltage line 602, a power line VPL and a plurality of logic circuits 611. The semiconductor apparatus 600 may include a power control circuit 620. The power control circuit 620 may include a plurality of power switches. The plurality of power switches may include first to n^th power switches 631 to 63n. The power control circuit 620 may further include a command circuit 640 and a delay chain 650. Similar reference numerals are used to refer to the same components as the components of the semiconductor apparatus 100 illustrated in FIG. 1, among the components of the semiconductor apparatus 600, and repeated descriptions for the same components will be omitted herein.

The power control circuit 620 may perform a power gating operation and a mode change operation together. The plurality of power switches of the power control circuit 620 may be modified from the plurality of power switches illustrated in FIG. 1 to perform the power gating operation together with the mode change operation. The command circuit 640 may generate a first high gating signal SBH1 and a first low gating signal SBL1 based on a command signal CMD. The command circuit 640 may generate the first high gating signal SBH1 and the first low gating signal SBL1 which have different logic levels, depending on the operation of the semiconductor apparatus 600. The semiconductor apparatus 600 may operate in an active mode and a standby mode. The active mode may be a power-on mode in which the semiconductor apparatus 600 may perform various operations. The standby mode may be a low power mode in which the semiconductor apparatus 600 consumes minimal power. For example, the standby mode may include a sleep mode, a power-down mode, a deep power-down mode, and so forth. In the standby mode of the semiconductor apparatus 600, the command circuit 640 may generate the first high gating signal SBH1 and the first low gating signal SBL1 which have logic high levels, based on the command signal CMD. In the active mode and a first mode of the semiconductor apparatus 600, the command circuit 640 may generate the first high gating signal SBH1 which has a logic low level and the first low gating signal SBL1 which has a logic high level. In the active mode and a second mode of the semiconductor apparatus 600, the command circuit 640 may generate the first high gating signal SBH1 which has a logic high level and the first low gating signal SBL1 which has a logic low level.

The delay chain 650 may receive the first high gating signal SBH1 and the first low gating signal SBL1. The delay chain 650 may generate a second high gating signal SBH2 and an n^th high gating signal SBHn by sequentially delaying the first high gating signal SBH1 by a duration of the first time. The delay chain 650 may generate a second low gating signal SBL2 and an n^th low gating signal SBLn by sequentially delaying the first low gating signal SBL1 by the duration of the first time. The delay chain 650 may further receive a first high switching signal HB1 and a first low switching signal LB1. The delay chain 650 may generate an (n−1)^th high switching signal HBn−1 and an n^th high switching signal HBn by sequentially delaying the first high switching signal HB1 by the duration of the first time. The delay chain 650 may generate an (n−1)^th low switching signal LBn−1 and an n^th low switching signal LBn by sequentially delaying the first low switching signal LB1 by the duration of the first time.

The first power switch 631 may receive the first high gating signal SBH1, the first low gating signal SBL1, the n^th high switching signal HBn and the n^th low switching signal LBn. In the standby mode of the semiconductor apparatus 600, the first power switch 631 may supply none of first and second power supply voltages VDDH and VDDL to the power line VPL based on the first high gating signal SBH1 and the first low gating signal SBL1. In the active mode of the semiconductor apparatus 600, the first power switch 631 may supply one of the first and second power supply voltages VDDH and VDDL to the power line VPL based on the first high gating signal SBH1, the first low gating signal SBL1, the n^th high switching signal HBn and the n^th low switching signal LBn.

The second power switch 632 may receive the second high gating signal SBH2, the second low gating signal SBL2, the (n−1)^th high switching signal HBn−1 and the (n−1)^th low switching signal LBn−1. In the standby mode of the semiconductor apparatus 600, the second power switch 632 may supply none of the first and second power supply voltages VDDH and VDDL to the power line VPL based on the second high gating signal SBH2 and the second low gating signal SBL2. In the active mode of the semiconductor apparatus 600, the second power switch 632 may supply one of the first and second power supply voltages VDDH and VDDL to the power line VPL based on the second high gating signal SBH2, the second low gating signal SBL2, the (n−1)ˆth high switching signal HBn−1 and the (n−1)ˆth low switching signal LBn−1.

The nˆth power switch 63n may receive the nˆth high gating signal SBHn and the nˆth low gating signal SBLn. In the standby mode of the semiconductor apparatus 600, the nˆth power switch 63n may supply none of the first and second power supply voltages VDDH and VDDL to the power line VPL based on the nˆth high gating signal SBHn and the nˆth low gating signal SBLn. In the active mode of the semiconductor apparatus 600, the nˆth power switch 63n may generate the first high switching signal HB1 and the first low switching signal LB1 based on the nˆth high gating signal SBHn and the nˆth low gating signal SBLn. The nˆth power switch 63n may generate the first high switching signal HB1 based on the nˆth high gating signal SBHn and may generate the first low switching signal LB1 based on the nˆth low gating signal SBLn. The nˆth power switch 63n may transition the logic level of the first high switching signal HB1 after a duration of the second time which begins after the logic level of the nˆth high gating signal SBHn transitions. The nˆth power switch 63n may transition the logic level of the first low switching signal LB1 after the duration of the second time which begins after the logic level of the nˆth low gating signal SBLn transitions. The duration of the second time may be shorter than the duration of the first time. The logic level of the first high switching signal HB1 may transition substantially simultaneously as soon as the logic level of the nˆth high gating signal SBHn transitions. The logic level of the first low switching signal LB1 may transition substantially simultaneously as soon as the logic level of the nˆth low gating signal SBLn transitions. The nˆth power switch 63n may supply one of the first and second power supply voltages VDDH and VDDL to the power line VPL based on the nˆth high gating signal SBHn, the nˆth low gating signal SBLn, the first high switching signal HB1 and the first low switching signal LB1.

If the semiconductor apparatus 600 enters the standby mode from the active mode, the first power switch to the nˆth power switch 631 to 63n may sequentially stop the supply of both the first and second power supply voltages VDDH and VDDL to the power line VPL with the first time interval. If the semiconductor apparatus 600 enters the active mode from the standby mode, the nˆth power switch 63n may supply one of the first and second power supply voltages VDDH and VDDL to the power line VPL depending on whether the semiconductor apparatus 600 operates in the first mode or the second mode. The second power switch 632 and the first power switch 631 may sequentially supply one of the first and second power supply voltages VDDH and VDDL to the power line VPL.

Figure 7:
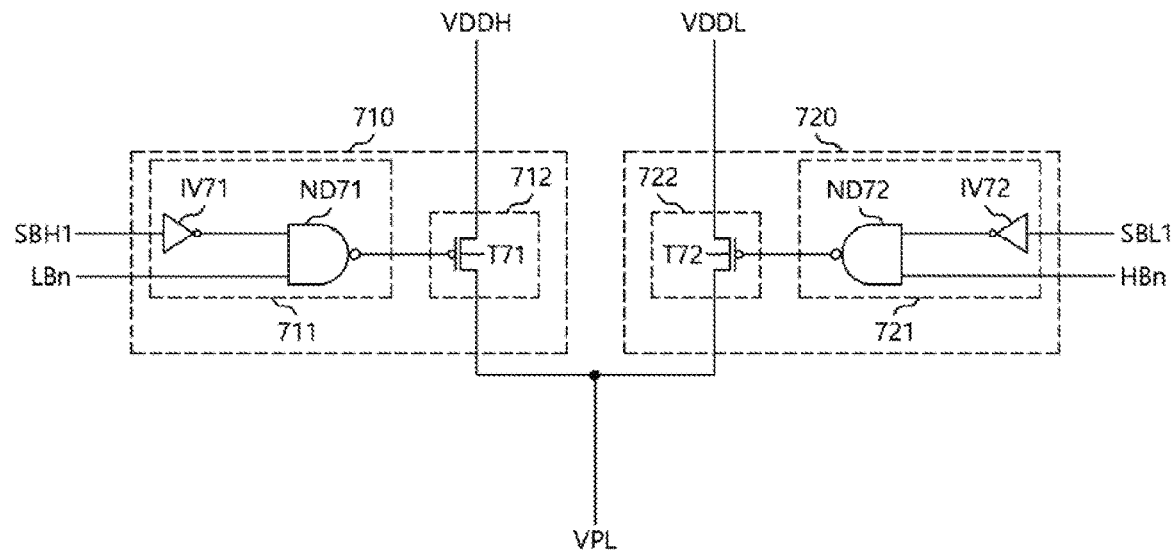
FIG. 7 is a diagram illustrating a configuration of a normal power switch in accordance with an embodiment.

FIG. 7 is a diagram illustrating a configuration of a normal power switch 700 in accordance with an embodiment. The normal power switch 700 may be applied as each of the first and second power switches 631 and 632 illustrated in FIG. 6. FIG. 7 illustrates that the normal power switch 700 is applied as the first power switch 631. The normal power switch 700 may include a high power switch 710 and a low power switch 720. The high power switch 710 may receive the first high gating signal SBH1 and the nˆth low switching signal LBn. The high power switch 710 may supply the first power supply voltage VDDH to the power line VPL based on the first high gating signal SBH1 and the nˆth low switching signal LBn. The low power switch 720 may receive the first low gating signal SBL1 and the nˆth high switching signal HBn. The low power switch 720 may supply the second power supply voltage VDDL to the power line VPL based on the first low gating signal SBL1 and the nˆth high switching signal HBn.

The high power switch 710 may include a first logic gate 711 and a first driver 712. The first logic gate 711 may receive the first high gating signal SBH1 and the nˆth low switching signal LBn. The first logic gate 711 may gate and output the first high gating signal SBH1 and the nˆth low switching signal LBn. The first driver 712 may receive the output of the first logic gate 711, and may supply the first power supply voltage VDDH to the power line VPL based on the output of the first logic gate 711. The low power switch 720 may include a second logic gate 721 and a second driver 722. The second logic gate 721 may receive the first low gating signal SBL1 and the nˆth high switching signal HBn. The second logic gate 721 may gate and output the first low gating signal SBL1 and the nˆth high switching signal HBn. The second driver 722 may receive the output of the second logic gate 721, and may supply the second power supply voltage VDDL to the power line VPL based on the output of the second logic gate 721.

The first logic gate 711 may include a first NAND gate ND71. The first NAND gate ND71 may receive the inverted signal of the first high gating signal SBH1 and the nˆth low switching signal LBn, and may perform a NAND logic calculation on the inverted signal of the first high gating signal SBH1 and the nˆth low switching signal LBn. The first logic gate 711 may further include a first inverter IV71 to invert the first high gating signal SBH1. The first driver 712 may include a first transistor T71. The first transistor T71 may be a P-channel MOS transistor. The first transistor T71 may have a gate which receives the output of the first NAND gate ND71, a source which receives the first power supply voltage VDDH and a drain which is coupled with the power line VPL.

The second logic gate 721 may include a second NAND gate ND72. The second NAND gate ND72 may receive the inverted signal of the first low gating signal SBL1 and the nˆth high switching signal HBn, and may perform a NAND logic calculation on the inverted signal of the first low gating signal SBL1 and the nˆth high switching signal HBn. The second logic gate 721 may further include a second inverter IV72 to invert the first low gating signal SBL1. The second driver 722 may include a second transistor T72. The second transistor T72 may be a P-channel MOS transistor. The second transistor T72 may have a gate which receives the output of the second NAND gate ND72, a source which receives the second power supply voltage VDDL and a drain which is coupled with the power line VPL.

The high power switch 710 may stop supplying the first power supply voltage VDDH to the power line VPL when the first high gating signal SBH1 is at a logic high level. The high power switch 710 may supply the first power supply voltage VDDH to the power line VPL when the first high gating signal SBH1 is at a logic low level and the nˆth low switching signal LBn is at a logic high level. The low power switch 720 may stop supplying the second power supply voltage VDDL to the power line VPL when the first low gating signal SBL1 is at a logic high level. The low power switch 720 may supply the second power supply voltage VDDL to the power line VPL when the first low gating signal SBL1 is at a logic low level and the nˆth high switching signal HBn is at a logic high level.

Figure 8:
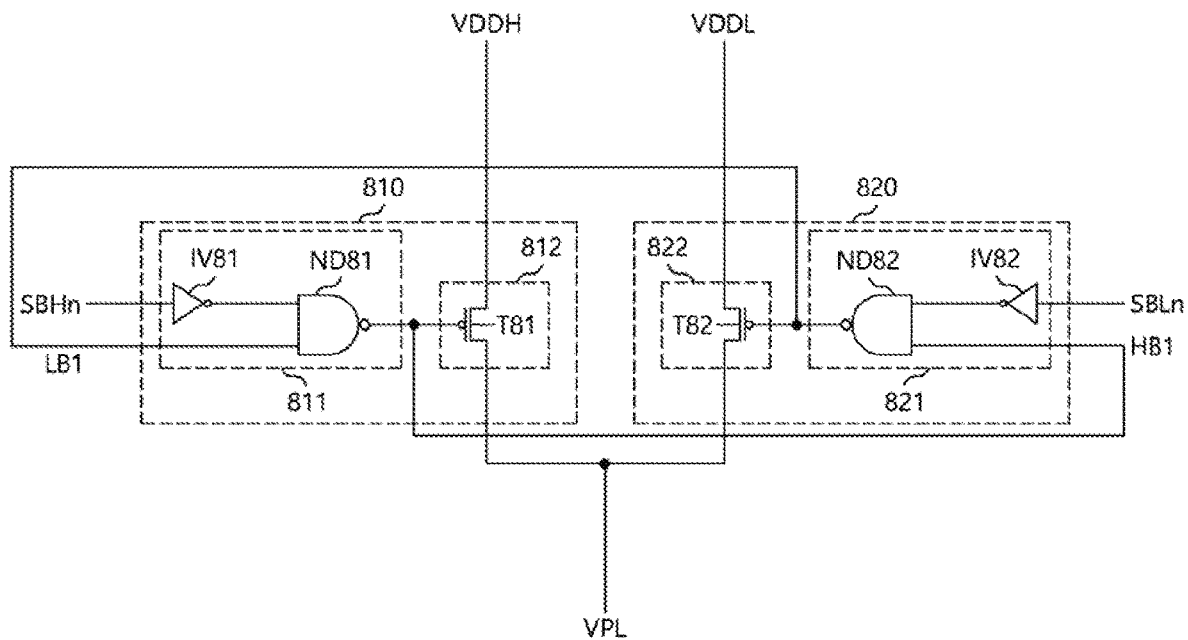
FIG. 8 is a diagram illustrating a configuration of a turning point power switch in accordance with an embodiment.

FIG. 8 is a diagram illustrating a configuration of a turning point power switch 800 in accordance with an embodiment. The turning point power switch 800 may be applied as the nˆth power switch 63n illustrated in FIG. 6.

FIG. 8 illustrates that the turning point power switch 800 is applied as the n^th power switch 63n. The turning point power switch 800 may include a high power switch 810 and a low power switch 820. The high power switch 810 may receive the n^th high gating signal SBHn and the first low switching signal LB1. The high power switch 810 may supply the first power supply voltage VDDH to the power line VPL based on the n^th high gating signal SBHn and the first low switching signal LB1. The high power switch 810 may generate the first high switching signal HB1 based on the n^th high gating signal SBHn and the first low switching signal LB1. The low power switch 820 may receive the n^th low gating signal SBLn and the first high switching signal HB1. The low power switch 820 may supply the second power supply voltage VDDL to the power line VPL based on the n^th low gating signal SBLn and the first high switching signal HB1. The low power switch 820 may generate the first low switching signal LB1 based on the n^th low gating signal SBLn and the first high switching signal HB1.

The high power switch 810 may include a first logic gate 811 and a first driver 812. The first logic gate 811 may receive the n^th high gating signal SBHn and the first low switching signal LB1. The first logic gate 811 may generate the first high switching signal HB1 by gating the n^th high gating signal SBHn and the first low switching signal LB1. The first driver 812 may receive the first high switching signal HB1, and may supply the first power supply voltage VDDH to the power line VPL based on the first high switching signal HB1.

The low power switch 820 may include a second logic gate 821 and a second driver 822. The second logic gate 821 may receive the n^th low gating signal SBLn and the first high switching signal HB1. The second logic gate 821 may generate the first low switching signal LB1 by gating the n^th low gating signal SBLn and the first high switching signal HB1. The second driver 822 may receive the first low switching signal LB1, and may supply the second power supply voltage VDDL to the power line VPL based on the first low switching signal LB1.

The first logic gate 811 may include a first NAND gate ND81. The first NAND gate ND81 may receive the inverted signal of the n^th high gating signal SBHn and the first low switching signal LB1, and may generate the first high switching signal HB1 by performing a NAND logic calculation on the inverted signal of the n^th high gating signal SBHn and the first low switching signal LB1. The first logic gate 811 may further include a first inverter IV81 to invert the n^th high gating signal SBHn. The first driver 812 may include a first transistor T81. The first transistor T81 may be a P-channel MOS transistor. The first transistor T81 may have a gate which receives the first high switching signal HB1, a source which receives the first power supply voltage VDDH and a drain which is coupled with the power line VPL.

The second logic gate 821 may include a second NAND gate ND82. The second NAND gate ND82 may receive the inverted signal of the n^th low gating signal SBLn and the first high switching signal HB1, and may generate the first low switching signal LB1 by performing a NAND logic calculation on the inverted signal of the n^th low gating signal SBLn and the first high switching signal HB1. The second logic gate 821 may further include a second inverter IV82 to invert the n^th low gating signal SBLn. The second driver 822 may include a second transistor T82. The second transistor T82 may be a P-channel MOS transistor. The second transistor T82 may have a gate which receives the first low switching signal LB1, a source which receives the second power supply voltage VDDL and a drain which is coupled with the power line VPL.

The high power switch 810 may stop supplying the first power supply voltage VDDH to the power line VPL when the n^th high gating signal SBHn is at a logic high level. The high power switch 810 may supply the first power supply voltage VDDH to the power line VPL when the n^th high gating signal SBHn is at a logic low level and the first low switching signal LB1 is at a logic high level. The low power switch 820 may stop supplying the second power supply voltage VDDL to the power line VPL when the n^th low gating signal SBLn is at a logic high level. The low power switch 820 may supply the second power supply voltage VDDL to the power line VPL when the n^th low gating signal SBLn is at a logic low level and the first high switching signal HB1 is at a logic high level.

Figure 9:
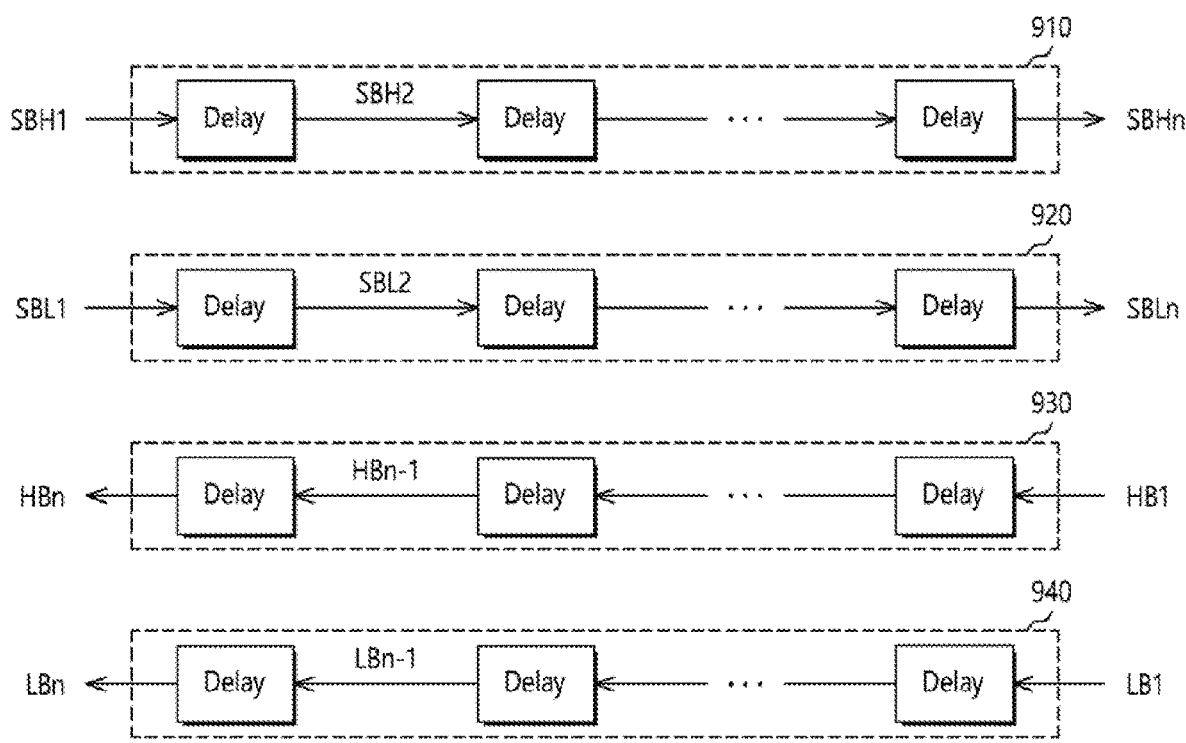
FIG. 9 is a diagram illustrating a configuration of the delay chain illustrated in FIG. 6.

FIG. 9 is a diagram illustrating a configuration of the delay chain 650 illustrated in FIG. 6. In FIG. 9, the delay chain 650 may include a first delay chain 910, a second delay chain 920, a third delay chin 930 and a fourth delay chain 940. Each of the first to fourth delay chains 910, 920, 930 and 940 may include a plurality of delays. One delay may have a delay amount corresponding to the duration of the first time. The plurality of delays of the first delay chain 910 may sequentially delay the first high gating signal SBH1. The first delay chain 910 may generate the second high gating signal SBH2 and the n^th high gating signal SBHn by sequentially delaying the first high gating signal SBH1. The plurality of delays of the second delay chain 920 may sequentially delay the first low gating signal SBL1. The second delay chain 920 may generate the second low gating signal SBL2 and the n^th low gating signal SBLn by sequentially delaying the first low gating signal SBL1.

The plurality of delays of the third delay chain 930 may sequentially delay the first high switching signal HB1. The third delay chain 930 may generate the (n−1)^th high switching signal HBn−1 and the n^th high switching signal HBn by sequentially delaying the first high switching signal HB1. The plurality of delays of the fourth delay chain 940 may sequentially delay the first low switching signal LB1. The fourth delay chain 940 may generate the (n−1)^th low switching signal LBn−1 and the n^th low switching signal LBn by sequentially delaying the first low switching signal LB1.

Figure 10:
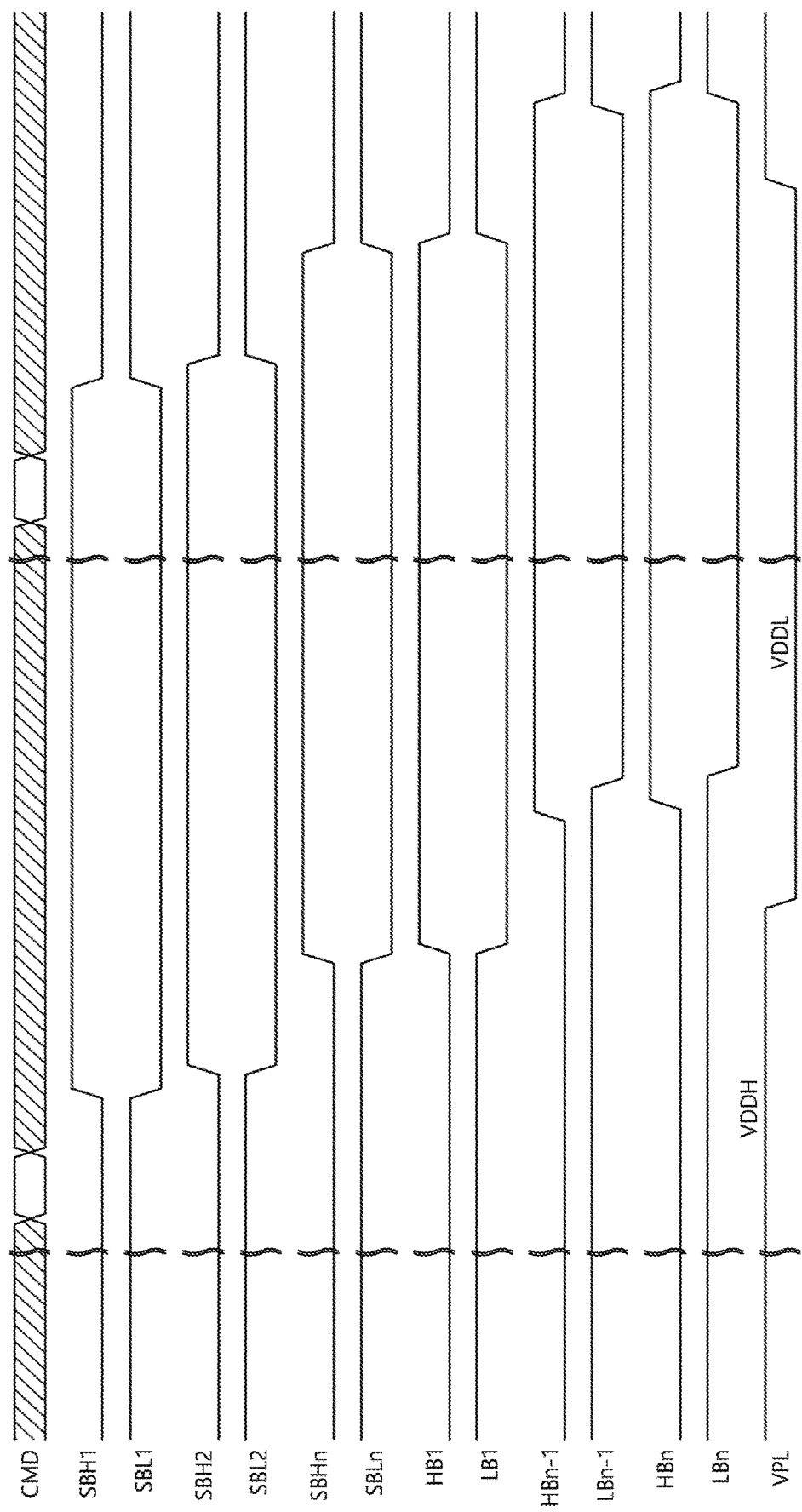
FIG. 10 is a timing diagram to assist in the explanation of the operation of the semiconductor apparatus in accordance with an embodiment.

FIG. 10 is a timing diagram to assist in the explanation of the operation of the semiconductor apparatus 600 in accordance with an embodiment. The operation of the semiconductor apparatus 600 in accordance with an embodiment will be described hereunder with reference to FIGS. 6 to 10. When the semiconductor apparatus 600 is in the standby mode, all the first to n^th high gating signals SBH1 to SBHn may be at logic high levels, and all the first to n^th low gating signals SBL1 to SBLn may also be at logic high levels. The first to n^th power switches 631 to 63n may supply none of the first and second power supply voltages VDDH and VDDL to the power line VPL.

When the semiconductor apparatus 600 enters the active mode from the standby mode and operates in the first mode, the first high gating signal SBH1 may transition to a logic low level, and the first low gating signal SBL1 may maintain a logic high level. If the first high gating signal SBH1 transitions to a logic low level, the second high gating signal SBH2 and the n^th high gating signal SBHn may sequentially transition to logic low levels. The n^th power switch 63n may receive the first low switching signal LB1 which has a logic high level, based on the n^th low gating signal SBLn. Therefore, the n^th power switch 63n may generate the first high switching signal HB1 which has a logic low level, based on the n^th high gating signal SBHn and the first low switching signal LB1, and may supply the first power supply voltage VDDH to the power line VPL. The delay chain 650 may transition the (n−1)^th low switching signal LBn−1 and the n^th low switching signal LBn to logic high levels by sequentially delaying the first low switching signal LB1. Thus, the second power switch 632 and the first power switch 631 may sequentially supply the first power supply voltage VDDH to the power line VPL.

As illustrated in FIG. 10, when the first mode is changed to the second mode depending on the operating speed of the semiconductor apparatus 600, the command circuit 640 may transition the first high gating signal SBH1 to a logic high level and transition the first low gating signal SBL1 to a logic low level, based on the command signal CMD. If the first high gating signal SBH1 transitions to a logic high level, the first power switch 631 may stop supplying the first power supply voltage VDDH to the power line VPL. The delay chain 650 may sequentially transition the logic levels of the second high gating signal SBH2 and the n^th high gating signal SBHn by sequentially delaying the first high gating signal SBH1, and may sequentially transition the logic levels of the second low gating signal SBL2 and the n^th low gating signal SBLn by sequentially delaying the first low gating signal SBL1. The second power switch 632 may stop supplying the first power supply voltage VDDH to the power line VPL based on the second high gating signal SBH2.

The n^th power switch 63n may transition the first high switching signal HB1 to a logic high level based on the n^th high gating signal SBHn. The n^th power switch 63n may transition the first low switching signal LB1 to a logic low level based on the n^th low gating signal SBLn and the first high switching signal HB1. The n^th power switch 63n may supply the second power supply voltage VDDL to the power line VPL based on the first low switching signal LB1 at substantially the same time as and/or with a substantially short time interval from when it stops supplying the first power supply voltage VDDH to the power line VPL based on the n^th high gating signal SBHn.

The delay chain 650 may sequentially transition the logic levels of the (n−1)^th high switching signal HBn−1 and the n^th high switching signal HBn to logic high levels by sequentially delaying the first high switching signal HB1. The delay chain 650 may sequentially transition the logic levels of the (n−1)^th low switching signal LBn−1 and the n^th low switching signal LBn to logic low levels by sequentially delaying the first low switching signal LB1. The second power switch 632 may supply the second power supply voltage VDDL to the power line VPL based on the second low gating signal SBL2 and the (n−1)^th high switching signal HBn−1. The first power switch 631 may sequentially supply the second power supply voltage VDDL to the power line VPL based on the first low gating signal SBL1 and the n^th high switching signal HBn.

When the second mode is changed to the first mode depending on the operating speed of the semiconductor apparatus 600, the command circuit 640 may transition the first high gating signal SBH1 to a logic low level and transition the first low gating signal SBL1 to a logic high level, based on the command signal CMD. If the first low gating signal SBL1 transitions to a logic high level, the first power switch 631 may stop supplying the second power supply voltage VDDL to the power line VPL. The delay chain 650 may sequentially transition the logic levels of the second high gating signal SBH2 and the n^th high gating signal SBHn by sequentially delaying the first high gating signal SBH1, and may sequentially transition the logic levels of the second low gating signal SBL2 and the n^th low gating signal SBLn by sequentially delaying the first low gating signal SBL1. The second power switch 632 may stop supplying the second power supply voltage VDDL to the power line VPL based on the second low gating signal SBL2.

The n^th power switch 63n may transition the first low switching signal LB1 to a logic high level based on the n^th low gating signal SBLn. The n^th power switch 63n may transition the first high switching signal HB1 to a logic low level based on the n^th high gating signal SBHn and the first low switching signal LB1. The n^th power switch 63n may supply the first power supply voltage VDDH to the power line VPL based on the first high switching signal HB1 at substantially the same time as and/or with a substantially short time interval from when it stops supplying the second power supply voltage VDDL to the power line VPL, based on the first low switching signal LB1.

The delay chain 650 may sequentially transition the logic levels of the (n−1)^th high switching signal HBn−1 and the n^th high switching signal HBn to logic low levels by sequentially delaying the first high switching signal HB1. The delay chain 650 may sequentially transition the logic levels of the (n−1)^th low switching signal LBn−1 and the n^th low switching signal LBn to logic high levels by sequentially delaying the first low switching signal LB1. The second power switch 632 may supply the first power supply voltage VDDH to the power line VPL based on the second high gating signal SBH2 and the (n−1)^th low switching signal LBn−1. The first power switch 631 may sequentially supply the first power supply voltage VDDH to the power line VPL based on the first high gating signal SBH1 and the n^th low switching signal LBn.

While various embodiments have been described above, it will be understood to those skilled in the art that the embodiments described are examples only. Accordingly, the power control circuits and the semiconductor apparatuses using the same described herein should not be limited based on the described embodiments.

What is claimed is:

1. A power control circuit comprising:
   a delay chain configured to generate a second forward switching signal by delaying a first forward switching signal, and generate a second backward switching signal by delaying a first backward switching signal;
   a first power switch configured to supply one of a first power supply voltage and a second power supply voltage to a power line based on a mode change signal, the first forward switching signal and the second backward switching signal; and
   a second power switch configured to generate the first backward switching signal based on the second forward switching signal, and supply one of the first power supply voltage and the second power supply voltage to the power line based on the mode change signal, the second forward switching signal and the first backward switching signal.

2. The power control circuit according to claim 1, wherein the first power switch comprises:
   a high power switch configured to supply the first power supply voltage to the power line based on the mode change signal, the first forward switching signal and the second backward switching signal; and
   a low power switch configured to supply the second power supply voltage to the power line based on the mode change signal, the first forward switching signal and the second backward switching signal.

3. The power control circuit according to claim 2, wherein the high power switch comprises:
a first selector configured to output one of the first forward switching signal and the second backward switching signal based on the mode change signal; and
a first driver configured to supply the first power supply voltage to the power line based on an output of the first selector.

4. The power control circuit according to claim 2, wherein the low power switch comprises:
a second selector configured to output one of the second backward switching signal and the first forward switching signal based on the mode change signal; and
a second driver configured to supply the second power supply voltage to the power line based on an output of the second selector.

5. The power control circuit according to claim 1, wherein the second power switch comprises:
a high power switch configured to supply the first power supply voltage to the power line based on the mode change signal, the second forward switching signal and the first backward switching signal; and
a low power switch configured to supply the second power supply voltage to the power line based on the mode change signal, the second forward switching signal and the first backward switching signal,
wherein the high power switch generates the first backward switching signal to be inputted to the low power switch, based on the received second forward switching signal, and the low power switch generates the first backward switching signal to be inputted to the high power switch, based on the received second forward switching signal.

6. The power control circuit according to claim 5, wherein the high power switch comprises:
a first selector configured to output one of the second forward switching signal and the first backward switching signal based on the mode change signal; and
a first driver configured to supply the first power supply voltage to the power line based on an output of the first selector.

7. The power control circuit according to claim 6, wherein the low power switch comprises:
a second selector configured to output one of the first backward switching signal and the second forward switching signal based on the mode change signal; and
a second driver configured to supply the second power supply voltage to the power line based on an output of the second selector,
wherein the first backward switching signal to be inputted to the first selector is generated based on the output of the second selector, and the first backward switching signal to be inputted to the second selector is generated based on the output of the first selector.

8. A power control circuit comprising:
a delay chain configured to generate a second high gating signal and a second low gating signal by delaying a first high gating signal and a first low gating signal, and generate a second high switching signal and a second low switching signal by delaying a first high switching signal and a first low switching signal;
a first power switch configured to supply a first power supply voltage and a second power supply voltage to a power line based on the first high gating signal, the first low gating signal, the second high switching signal and the second low switching signal; and
a second power switch configured to supply the first power supply voltage and the second power supply voltage to the power line based on the second high gating signal, the second low gating signal, the first high switching signal and the first low switching signal, generate the first high switching signal based on the second high gating signal, and generate the first low switching signal based on the second low gating signal.

9. The power control circuit according to claim 8, wherein the first power switch comprises:
a high power switch configured to supply the first power supply voltage to the power line based on the first high gating signal and the second low switching signal; and
a low power switch configured to supply the second power supply voltage to the power line based on the first low gating signal and the second high switching signal.

10. The power control circuit according to claim 9, wherein the high power switch comprises:
a first logic gate configured to gate the first high gating signal and the second low switching signal; and
a first driver configured to supply the first power supply voltage to the power line based on an output of the first logic gate.

11. The power control circuit according to claim 9, wherein the low power switch comprises:
a second logic gate configured to gate the first low gating signal and the second high switching signal; and
a second driver configured to supply the second power supply voltage to the power line based on an output of the second logic gate.

12. The power control circuit according to claim 8, wherein the second power switch comprises:
a high power switch configured to generate the first high switching signal based on the second high gating signal and the first low switching signal, and supply the first power supply voltage to the power line based on the first high switching signal; and
a low power switch configured to generate the first low switching signal based on the second low gating signal and the first high switching signal, and supply the second power supply voltage to the power line based on the first low switching signal.

13. The power control circuit according to claim 12, wherein the high power switch comprises:
a first logic gate configured to generate the first high switching signal by gating the second high gating signal and the first low switching signal; and
a first driver configured to supply the first power supply voltage to the power line based on the first high switching signal.

14. The power control circuit according to claim 12, wherein the low power switch comprises:
a second logic gate configured to generate the first low switching signal by gating the second low gating signal and the first high switching signal; and
a second driver configured to supply the second power supply voltage to the power line based on the first low switching signal.

15. A semiconductor apparatus comprising:
at least one logic circuit configured to operate by being supplied with power through a power line; and
a power control circuit including first to n^th power switches which supply a first power supply voltage and a second power supply voltage to the power line, n being an integer equal to or more than 2, wherein, when being changed to a first mode, the power control circuit causes the first to n^th power switches to sequentially stop supplying the second power supply voltage to the power line and then causes the n^th to first power switches to sequentially supply the first power supply voltage to the power line, and, when being changed to a second mode, the power control circuit causes the first to n^th power switches to sequentially stop supplying the first power supply voltage to the power line and then causes the n^th to first power switches to sequentially supply the second power supply voltage to the power line.

16. The semiconductor apparatus according to claim 15, wherein the power control circuit generates first to n^th forward switching signals and first to n^th backward switching signals which control the first to n^th power switches, respectively, and wherein, when one of the first and second modes is changed to the other one, logic levels of the first to n^th forward switching signals sequentially transition with a first time interval, and logic levels of the first to n^th backward switching signals sequentially transition with the first time interval.

17. The semiconductor apparatus according to claim 16, wherein the power control circuit generates the first backward switching signal based on the n^th forward switching signal, and transitions a logic level of the first backward switching signal after a duration of a second time, the duration of the second time beginning after a logic level of the n^th forward switching signal transitions.

18. The semiconductor apparatus according to claim 17, wherein the duration of the second time is shorter than the duration of the first time.

19. The semiconductor apparatus according to claim 16, wherein the power control circuit generates the first backward switching signal based on the n^th forward switching signal, and transitions a logic level of the first backward switching signal at substantially the same time as a logic level of the n^th forward switching signal transitions.

20. The semiconductor apparatus according to claim 16, wherein the power control circuit further includes a delay chain which generates the second to n^th forward switching signals by sequentially delaying the first forward switching signal and generates the second to n^th backward switching signals by sequentially delaying the first backward switching signal.

21. The semiconductor apparatus according to claim 15, wherein the power control circuit causes the first to n^th power switches to stop supplying the first and second power supply voltages to the power line during a standby mode of the semiconductor apparatus and causes the first to n^th power switches to sequentially supply one of the first and second power supply voltages to the power line in an active mode of the semiconductor apparatus.

22. The semiconductor apparatus according to claim 21, wherein the power control circuit generates first to n^th high gating signals, first to n^th low gating signals, first to n^th high switching signals and first to n^th low switching signals which control the first to n^th power switches, wherein logic levels of the first to n^th high gating signals sequentially transition with a first time interval, and logic levels of the first to n^th low gating signals sequentially transition with the first time interval, and wherein logic levels of the first to n^th high switching signals sequentially transition with the first time interval, and logic levels of the first to n^th low switching signals sequentially transition with the first time interval.

23. The semiconductor apparatus according to claim 22, wherein the power control circuit generates the first high switching signal after a duration of a second time beginning when a logic level of the n^th high gating signal transitions, and generates the first low switching signal after the duration of the second time beginning when a logic level of the n^th low gating signal transitions.

24. The semiconductor apparatus according to claim 23, wherein the duration of the second time is shorter than the duration of the first time.

25. The semiconductor apparatus according to claim 22, wherein the power control circuit transitions a logic level of the first low switching signal at substantially the same time as a logic level of the n^th high gating signal transitions, or transitions a logic level of the first high switching signal at substantially the same time as a logic level of the n^th low gating signal transitions.

26. The semiconductor apparatus according to claim 22, wherein the power control circuit further includes a delay chain which generates the second to n^th high gating signals by sequentially delaying the first high gating signal and generates the second to n^th low gating signals by sequentially delaying the first low gating signal and which generates the second to n^th high switching signals by sequentially delaying the first high switching signal and generates the second to n^th low switching signals by sequentially delaying the first low switching signal.

* * * * *